(12) United States Patent
Yoshida

(10) Patent No.: US 6,554,479 B2
(45) Date of Patent: Apr. 29, 2003

(54) BELL BEARING AND METHOD OF PRODUCING THE SAME

(75) Inventor: Naohiro Yoshida, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/977,247

(22) Filed: Oct. 16, 2001

(65) Prior Publication Data

US 2002/0054721 A1 May 9, 2002

(30) Foreign Application Priority Data

Oct. 16, 2000 (JP) ........................................ 2000-315000

(51) Int. Cl.⁷ ............................. F16C 19/00; F16C 43/06
(52) U.S. Cl. ....................... 384/450; 384/513; 384/523; 29/898.09; 29/898.064
(58) Field of Search ........................... 384/445, 450, 384/456, 490, 513, 523, 531; 29/898.064, 898.09

(56) References Cited

U.S. PATENT DOCUMENTS 5,782,563 A * 7/1998 Muto et al. ................. 384/450
6,416,230 B1 * 7/2002 Staudigel et al. ........... 384/523
6,474,891 B1 * 11/2002 Yajima et al. .............. 384/450

* cited by examiner

*Primary Examiner*—Thomas R. Hannon
(74) *Attorney, Agent, or Firm*—Crowell & Moring LLP

(57) ABSTRACT

A ball bearing comprising an inner ring having an outer peripheral surface formed with an inner ring raceway thereon, an outer ring having an inner peripheral surface formed with an outer ring raceway thereon, a cage made of synthetic resin and rotatably disposed relative to the inner ring and outer ring and having a plurality of pockets formed therein, and a plurality of balls held in the pockets, respectively, to be rotatably disposed between the inner ring raceway and outer ring raceway, wherein in the state before the cage is disposed between the inner ring and the outer ring, and where the balls held in the pockets are displaced toward the radially inside of the cage until the rolling contact surface of the balls comes in contact with the inner surface of the respective pockets to produce a circumscribed circle with a diameter with respect to the balls, the diameter of the circumscribed circle is smaller than the inner diameter of the outer ring raceway by an amount in the range 10 $\mu$m to 60 $\mu$m.

4 Claims, 12 Drawing Sheets

BELL BEARING AND METHOD OF PRODUCING THE SAME

BACKGROUND OF THE INVENTION

1. Field of the Invention

The present invention is related to a ball bearing to be installed in a spindle motor to be installed in a disc drive device of the magnetic, optical or optimagnetic type such as a hard disc drive device (HDD), a flexible disc drive device (FDD), a digital video disc (DVD), a mini-disc (MD).

2. Related Art of the Invention

For example, the HDD for use in the memory device etc. of the computer has a ball bearing provided around a shaft fixed to the housing fixed to the frame etc. so as to rotatably support a hub. At least one annular hard disc has an inner peripheral edge connected to and supported by the hub to rotate together with the hub. In addition, a stator is fixed to part of the outer peripheral surface of the support shaft, while a motor is fixed to a portion of the inner peripheral surface of the hub facing the outer peripheral surface of the stator whereby a spindle motor is formed to drive and rotate the hub. Power is applied to the stator to drive and rotate the hard disc when using the spindle motor for the HDD.

The ball bearing 1 as shown in FIG. 13 is widely used to be installed in the spindle motor for HDD. The ball bearing 1 comprises an inner ring 3 having an outer peripheral surface formed with an inner ring raceway 2, an outer ring 5 having an inner peripheral surface formed with an outer ring raceway 4 and concentric with the inner ring 3, and a plurality of balls 6 rotatably provided between the inner ring raceway 2 and the outer ring raceway 4. The balls 6 are held rotatably by a cage 8. An annular shield plate 7 is attached to the inner peripheral surface at either end of the outer ring 5. With the shield plate 7 at either end, grease is prevented from leaking to the outside from the portion where the balls 6 are provided, or dust floating in the outside is prevented from entering the portion where the balls 6 are provided.

In the example illustrated, the cage 8 is of the so-called crown type, and as shown in FIGS. 14 to 16, comprises an annular main portion 9 and pockets 10 provided on one axial side (on the upper side in FIG. 16) of the main portion 9 of the main portion 9 and spaced apart from each other with a uniform interval therebetween. Each of the pockets 10 is defined by a pair of resilient piece portions 11 spaced apart from each other with a concave surface portion 12 provided between the pair of resilient piece portions on the one side. The balls 6 are rotatably held in the pockets 10, respectively. The pockets 10 have a generally spherical concave inner surface the radius of curvature of which is slightly larger than the radius of curvature of the rolling contact surface of the balls 6. The cage 8 is integrally made of synthetic resin and formed through injection molding.

The balls 6 are forced in between the pairs of the resilient piece portions 11 resiliently enlarging the distance between the tip ends of the pairs of the resilient piece portions 11 of the pockets 10, respectively. And, as shown in FIG. 17, the balls 6 in the nested state, are rotatably held in the pockets 10, respectively. In this state, there is a minute clearance between the rolling contact surface of the balls 6 and the inner surface of the pockets 10. Accordingly, in the state where the balls 6 are forced in the pockets 10, the balls 6 are rotatably held by the cage 8 with a uniform interval therebetween in the circumferential direction, and the radial position of the cage 8 is restricted by the balls 6. Incidentally, the ball bearing 1 to be installed in the HDD has the inner diameter $d_3$ (FIG. 13) of the inner ring 3 sized between 4 mm to 6 mm.

Recently, the rotation speed of the spindle motor installed in the HDD becomes high as the performance of the personal computer (PC) with the HDD installed therein becomes high. Also, as the density of the HDD becomes high, it is required that the degree of the runout allowed in the hub to which the hard disc is fixed, must be controlled very small. Accordingly, with the ball bearing 1 to be installed in the rotational support portion of the spindle motor, it is required that the rotation resistance is reduced for high rotation, and that the non repeatable runout (NRRO) produced during high speed rotation must be reduced. In addition, it is required that the rotation resistance of the ball bearing 1 is reduced to reduce the power consumption in the rotation machines in which the ball bearing 1 is installed.

Conventionally, however, it was difficult to constantly realize the ball bearings 1 with sufficient performance as mentioned above. The following are reasons of this point.

It is necessary for reduction of the NRRO that minute vibrations must be refrained from occurring in the cage 8 for rotatably holding the balls 6 as the balls 6 rotate as the inner ring 3 and the outer ring 5 rotate relative to each other. If the cage 8 vibrates during operation, the attitude (the location in the axial and circumferential directions of the ball bearing 1) of the balls 6 held in the cage 8 is so unstable to make the NRRO large. In order to suppress the minute vibration of the cage 8 to make the NRRO small, the clearance between the inner surface of the pockets 10 and the rolling contact surface of the balls 6 must be made small to minimize the amount of relative displacement of the cage 8 with reference to the balls 6.

On the other hand, if the clearance between the inner surface of the pockets 10 and the rolling contact surface of the balls 6 is made too small, the rotation resistance of the balls 1 becomes large. Specifically, the clearance is too small, large shearing force exerts to the lubricant film such as grease in the clearance during operation of the ball bearing 1, and the resistance against the spinning balls 6 within the pockets 10 becomes large. As a result, the rotation resistance of the ball bearing 1 is large, it is hard to reduce the power consumption in the HDD etc., in which the ball bearing 1 is installed. Therefore, it is impossible to make the clearance excessively small.

As mentioned above, in order to reduce the NRRO of the ball bearing 1 and to make the rotation resistance small, not only the clearance between the inner surface of the pockets 10 and the rolling contact surface of the balls 6 is made small, but also its size must be properly controlled. The size of the clearance between the inner surface of the pockets 10 and the rolling contact surface of the balls 6 is determined by the pitch circle diameter (PCD) and inner diameter of the cage 8, the inner diameter of the pockets 10, the inner diameter at the opening end edge of the inner surface of the pockets 10, and the outer diameter of the balls 6 and other factors. Accordingly, in the prior art structure, in order to properly control the size of the clearance, the sizes of these factors are separately regulated, and only the cages 8 and balls 6 in which these factors are proper must be selected from the completed ones, and combined with the outer ring 5 and inner ring 3.

However, when the sizes of the factors are separately regulated to make the size of the clearance proper, errors inevitably produced in manufacturing complicatedly effect with respect to the sizes of the factors, and the variation of the size of the clearance may become large. When the variation of the size of the clearance is large, it is difficult to properly regulate the size of the clearance in the ball bearing 1 after it is completed. Accordingly, it was difficult with the prior art structure to constantly manufacture the ball bearing 1 with both of the NRRO and rotation resistance reduced.

Although it is taken into consideration that when the size of the clearance between the inner surface of the pockets 10 and the rolling contact surface of the balls 6 is found to be inadequate, the ball bearing 1 is disassembled and reassembled together with proper parts selected for the proper size of the clearance, it is inconvenient to take such operation for disassembling and reassembling. Accordingly, practically, the ball bearing 1 the clearance size of which is inadequate is thrown away as poor product, and not reused, which increases useless parts, resulting in that the yield of the parts is worsened, and the cost of the ball bearing 1 becomes high.

SUMMARY OF THE INVENTION

An objective of the present invention is to provide a structure of the ball bearing in which both of the NRRO and rotation resistance are sufficiently decreased and such ball bearings are constantly manufactured at a lower cost.

DETAILED DESCRIPTION OF THE PREFERRED EMBODIMENTS

Figure 1:
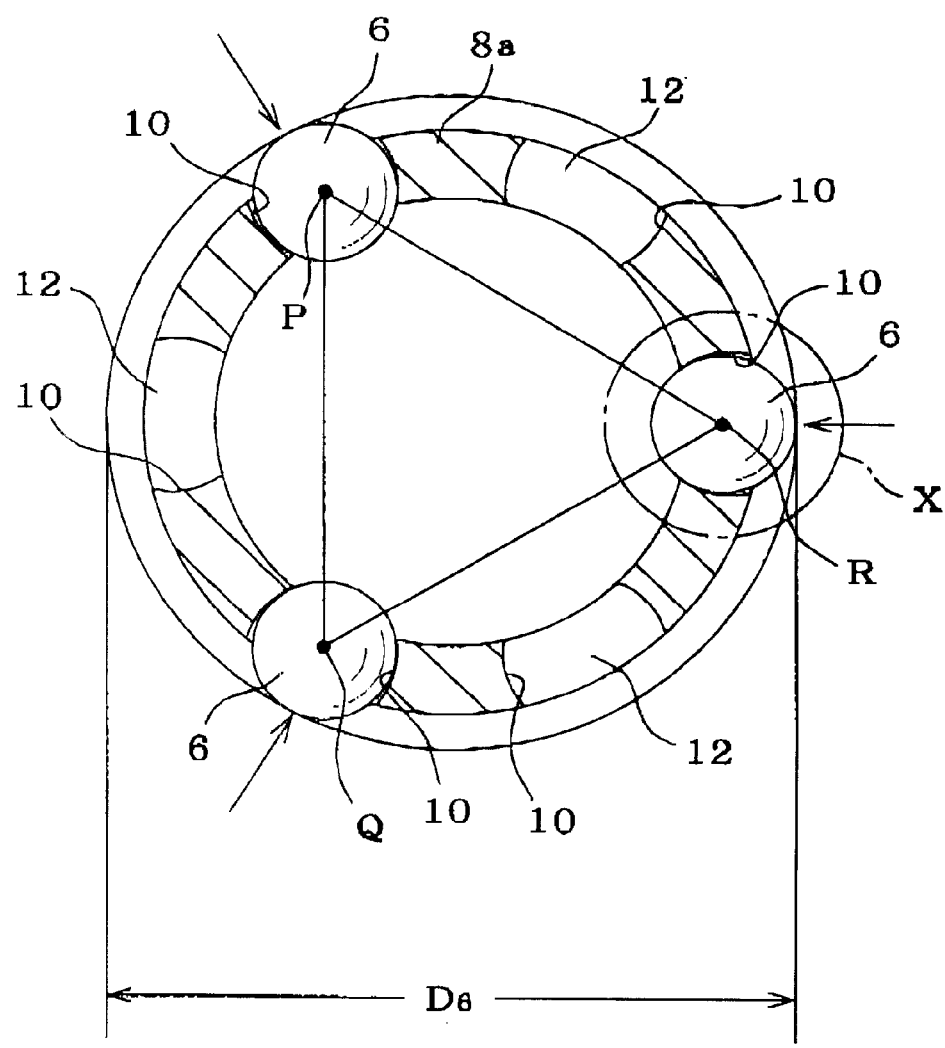
FIG. 1 is a cross sectional view of the cage for use in a first example of the embodiment of the present invention in the state where three balls are held in three pockets with a uniform interval in the circumferential direction of the cage and then moved radially inward in the cage as shown by arrows.

A ball bearing according to the present invention comprises, like the conventional one as mentioned above, an inner ring having an outer peripheral surface formed with an inner ring raceway thereon, an outer ring having an inner peripheral surface formed with an outer ring raceway thereon, a cage made of synthetic resin and rotatably disposed relative to the inner ring and outer ring, and a plurality of balls rotatably disposed between the inner ring raceway and outer ring raceway, and held in the pockets of the cage, respectively.

In addition with respect to the ball bearing, in the state before the cage is disposed between the inner ring and the outer ring, and where the balls held in the pockets are displaced toward the radially inside of the cage until the rolling contact surface of the balls comes in contact with the inner surface of the respective pockets to produce a circumscribed circle with a diameter with respect to the balls, wherein the diameter of the circumscribed circle is smaller than the inner diameter of the outer ring raceway by an mount in the range of 10 $\mu$m to 60 $\mu$m. The inner diameter of the inner ring is preferably in the range of 4 mm to 6 mm.

A method of producing the ball bearing in the present invention comprises the steps of selecting and holding some of the balls in some of the pockets, respectively, moving these selected balls in these pockets radially inward with reference to the cage, respectively, and in this state, obtaining the diameter of the circumscribed circle with respect to the selected balls, that is the diameter of the circle contacting from outside the rolling contact surface of the balls, and installing the cage with all the balls in between the outer ring and inner ring only in the case where the diameter is smaller than the inner diameter of the outer ring raceway by an amount from 10 $\mu$m to 60$\mu$m.

In the ball bearing of the present invention, the dimensions of the ball bearing directly related to the size of the clearance between the inner surface of the pockets of the cage and the rolling contact surface of the balls are properly regulated. Accordingly, the ball bearing in which both of the NRRO and rotation resistance are sufficiently decreased is realized and such ball bearings are constantly manufactured at a lower cost. Accordingly, the performance of the rotation machines such as HDDs in which the ball bearing of the present invention is installed is made high while the power consumption of the rotation machines is made low.

It is possible in the method of producing the ball bearing of the present invention to determine the good or not with respect to the size of the clearance at the step where only the cage and balls are combined with each other before assembling them in the ball bearing. Therefore, there is no need of disassembling and reassembling the ball bearing once it is assembled, or there is no useless loss that the whole ball bearing thrown away after it has been assembled. So, efficiency of production work and the yield of the parts are increased, and the cost is reduced Now, the present invention is explained referring to the drawings attached.

Figure 2:
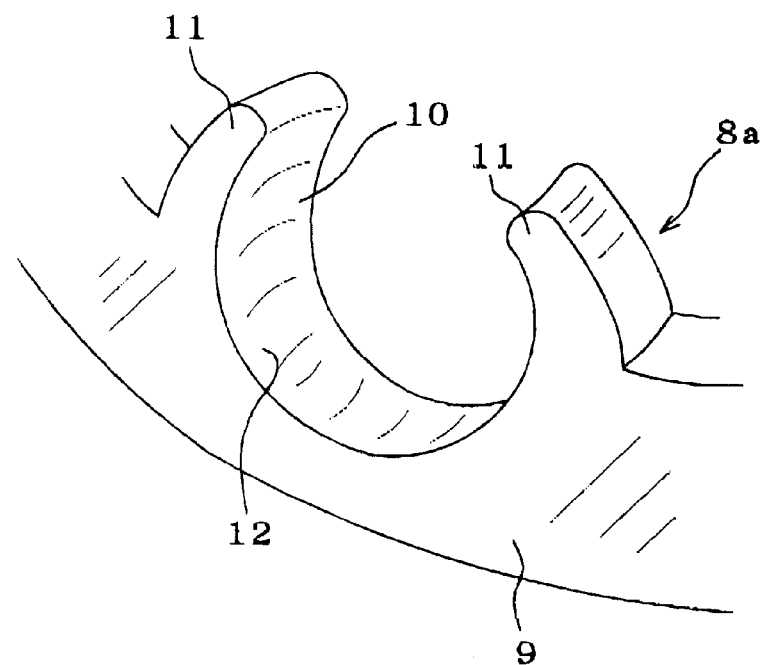
FIG. 2 is a perspective view of part of the cage.
Figure 3:
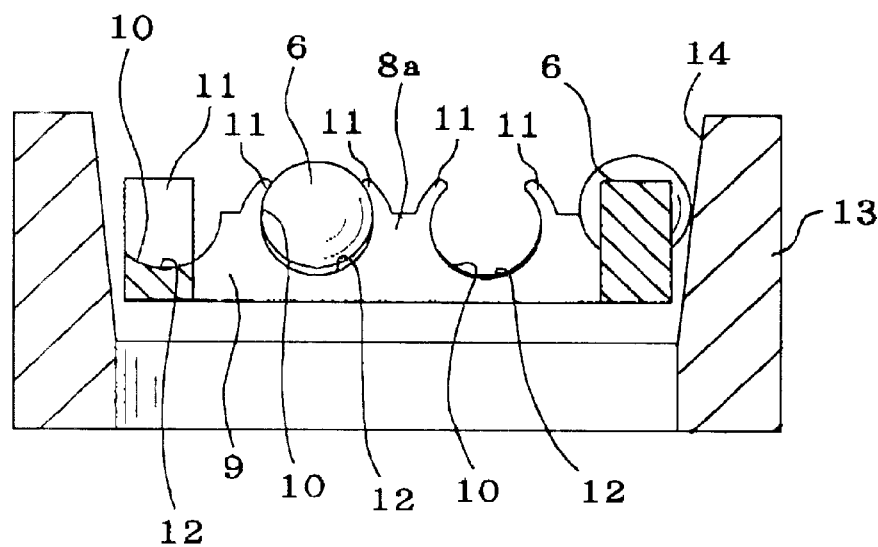
FIG. 3 is a cross sectional view of a cage and a gage in the state where the diameter of the circumscribed circle of the balls held in the cage is measured.

FIGS. 1 to 3 show a first example of the embodiment of the present invention. The ball bearing according to the present invention comprises an inner ring 3 having an outer peripheral surface formed with an inner ring raceway 2, an outer ring 5 (see FIG. 13) having an inner peripheral surface formed with an outer ring raceway 4, a cage 8a made of synthetic resin and arranged to be relatively rotated with reference to the inner ring 3 and the outer ring 5, the cage 8a having a plurality (six in the case of FIG. 1) of pockets 10 provided therein, and a plurality of balls 6 held rotatably in the pockets 10, respectively, between the inner ring raceway 2 and the outerring raceway 4, which is similar to the conventional structure shown in FIG. 13. The cage 8a is of the crown type, which is similar to the conventional structures shown in FIGS. 14 to 16, and comprises annular main portion 9 and a plurality of pockets 10 arranged on one axial side of the main portion 9 with a uniform interval therebetween. The balls 6 are rotatably held in the pockets 10, respectively. The inner surface of the pockets 10 is formed generally in a single spherical concave surface, the radius of curvature of which is slightly larger than the radius of curvature of the rolling contact surface of the respective balls 6. The synthetic resin for the cage 8a is for example polyacetal, polyamid 66 resin in which glass fiber is contained by the amount of about 10 percent by volume or about 25 percent by volume. The inner diameter $d_3$ (see FIG. 13) of the inner ring 3 of the ball bearing of the present invention is in the range from 4 mm to 6 mm.

Particularly in the case of the ball bearing of the present invention, in the state that the cage 8a is not provided between the inner ring 3 and the outer ring 5, and that the balls 6 held in the respective pockets 10 are displaced to the radially inner side of the cage 8a indicated by arrows until the rolling contact surface of the balls 6 comes into contact with the inner surface of the pockets 10 (with the radially inner end edge in the case of the present example), the diameter $D_6$ of the circumscribed circle with respect to the balls 6 is smaller than the inner diameter $d_4$ (see FIG. 13) of the inner ring raceway 4 by an amount in the range of 10 $\mu$m to 60 $\mu$m. That is, $D_6=d_4-(10$ to $60$ $\mu$m.).

The reason of this is as follows: If the diameter $D_6$ of the circumscribed circle of the balls 6 is smaller than the lower limit of the range specified in the present invention, that is if $D_6<d_4-60$ $\mu$m, the clearance between the inner surface of the pockets 10 and the rolling contact surface of the balls 6 is excessively large in the state where the cage 8a is installed between the inner ring 3 and the outer ring 5, resulting in that minute vibration of the cage is larger and that it is difficult to reduce the non-repeatable runout (NRRO) of the ball bearing 1.

On the other hand, if the diameter $D_6$ of the circumscribed circle of the balls 6 is larger than the upper limit of the range specified in the present invention, that is if $D_6<d_4-10$ $\mu$m, the clearance between the inner surface of the pockets 10 and the rolling contact surface of the balls 6 is too small in the state where the cage 8a is installed between the inner ring 3 and the outer ring 5, resulting in that the rotation resistance of the ball bearing 1 is large. Therefore, in the present invention, the diameter $D_6$ of the circumscribed circle with respect to the balls 6 is smaller than the inner diameter $d_4$ (see FIG. 13) of the inner ring raceway 4 by an amount in the range of 10 $\mu$m to 60 $\mu$m.

In the method of producing the ball bearing of the present invention comprises the following steps to assemble the ball bearing. Specifically, the cage 8a, balls 6, outer ring 5, and inner ring 3 are produced, respectively. Then, three of the balls 6 are held in three of the pockets 10 respectively with a unform interval circumferentially (in the figure, every two pockets). Then, these balls 6 are moved in the respective pockets 10 radially inward with reference to the cage 8a as indicated by arrows, and in this state, the diameter $D_6$ of the circumscribed circle with respect to these balls 6 is obtained. Next, only in the case where the diameter $D_6$ is smaller than the inner diameter $d_4$ of the outer ring raceway 4 by an amount from 10 $\mu$m to 60 $\mu$m, the work to install the cage 8a and ball 6 between the outer ring 5 and the inner ring 3 is conducted. For assembling the ball bearing 1, a gage 13 as shown in FIG. 3 is used in the case of the present invention. The gage 13 is formed generally in a cylindrical shape to have an inner peripheral surface in a conical concave shape inclined slightly with reference to the axial direction.

In order to obtain the diameter $D_6$ of the circumscribed surface with respect to the balls 6, the gage 13 is set with the larger inner diameter side located on the upper side. Then, three of the balls 6 are held in three of the pockets 10, respectively, with a unform interval circumferentially. Then, the cage 8a is inserted into the gage 13 from the upper opening of the gage 13, that is from the end opening on the larger inner diameter side of the gage 13. In this state, the cage 8a is moved into the gage 13 due to gravity, so that the rolling surface of the balls 6 comes into contact with the conical concave surface 14. As the balls move downward along the conical concave surface 14, the diameter $D_6$ of the circumscribed circle with respect to the balls 6 is reduced. In the state where the rolling contact surface of the balls 6 comes into contact with the radially inner end edge of the pockets 10 of the cage 8a, the balls 6 are held between the conical concave surface 14 and the radially inner end edge of the pockets 10, so that the diameter $D_6$ is no more redeced and that the displacement of the cage 8a downward with reference to the gage 13 is stopped. In this state, the inner diameter of the gage 13 corresponding to the length by which the cage 8a has been inserted into the gage 13 is obtained as the diameter $D_6$ of the circumscribed circle with respect to the balls 6. In the case of the present invention, only when the diameter $D_6$ of the circumscribed circle with respect to the balls 6 obtained as mentioned above is smaller than the inner diameter $d_4$ of the outer ring raceway 4 by an amount from 10 $\mu$m to 60 $\mu$m, the work to install the cage 8a and ball 6 between the outer ring 5 and the inner ring 3 is conducted.

In the case of the ball bearing of the present invention, the size directly related to the size of the clearance existing between the inner surface of the respective pockets 10 of the cage 8a and the rolling contact surface of the respective balls 6, specifically the diameter $D_6$ of the circumscribed circle with respect to the balls 6 is regulated in the range as mentioned above. Accordingly, variation in size of the clearance of the finished ball bearings 1 is not large, so that it is possible to realize the ball bearings in which the NRRO is sufficiently reduced and the rotation resistance is made sufficiently small. Consequently, it is posssible to improve the performance of the rotation machines such as HDDs with the ball bearing installed therein, and to reduce the power consumption for the rotation machines.

According to the method of assembling the ball bearing of the present invention, it is possible to determine the good or not of the size of the clearance at the step where the cage 8a is combined only with the balls 6 before assembling them in the ball bearing. Accordingly, there is no need of disassembling and reassembling the ball bearing which has been assembled, or of throwing away the whole ball bearing which is assembled, causing no useless loss. Therefore, the efficiency of production work and yield of parts are improved so as to reduce the cost. In addition, since the diameter $D_6$ of the circumscribed circle of the balls 6 is obtained using the cylindrical gage 13 having the conical concave surface 14 in the inner peripheral surface, and so the diameter $D_6$ of the circumscribed circle of the balls 6 can be easily obtained so as to reduce the cost of the ball bearing 1.

In addition, in the case of the present invention, the diameter $D_6$ of the circumscribed circle of the balls 6 can be precisely obtained. Specifically, in the case of the present invention, in order to obtain the diameter $D_6$ of the circumscribed circle of the balls 6, the cage 8a is inserted into the gage 13 with the balls 6 held in the pockets 10 circumferentially arranged with a uniform interval in the cage 8a.

On the other hand, it is possible to insert the cage 8a into the gage 13 with three of the balls 6 held in three of the pockets at three locations (for example concentrated on one circumferential half side) largely displaced from the circumferentially uniform interval locations of the cage 8a. In this case, forces are applied to the cage 8a from the balls 6 at the non-uniform interval locations in the circumferential direction of the cage 8a. Accordingly, the cage 8a is displaced toward the side where the balls 6 do not exist, so that the center of the cage 8a may not coincide with the center of the gage 13. In other words, the cage 8a may not be concentrically located with reference to the gage 18. In the case where the cage 8a is not concentrically located with reference to the gage 18, it is impossible to precisely obtain the diameter $D_6$ of the circumscribed circle of the balls 6. In the present example, the cage 8a is inserted into the gage 13 with the balls 6 held in the pockets 10 circumferentially arranged with a uniform interval in the cage 8a in order to obtain the diameter $D_6$ of the circumscribed circle of the balls 6, and therefore the cage 8a is precisely concentrically located with reference to the gage 18, and it is possible to precisely obtain the diameter $D_6$ of the circumscribed circle of the balls 6.

When three of the balls 6 are held in three of the pockets located near the circumferentially uniform interval locations of the cage 8a (see FIG. 4), a triangle PQR is formed by connecting the centers P, Q and R of the three balls 6 to each other, and the angles at the apexes ($\angle PQR$, $\angle QRP$, $\angle RPQ$) are all an acute angle. Accordingly, the forces applied to the balls 6 from the conical concave saurface 14 are offset inside the triangle PQR to keep the cage 8a and the conical concave surface 14 concentric with each other. Accordingly, there is no need of taking care of making the cage 8a and the conical concave surface 14 concentric with each other. In other words, it is preferable that the angles at the apexes ($\angle PQR$, $\angle QRP$, $\angle RPQ$) arc all an acute angle in the traingle PQR formed by connecting the centers P, Q, R of the three balls 6 when inserting the cage 8a with the balls 6 located in the three pockets 10, into the gage 13 so as to precisely obtain the diameter $D_6$ of the circumscribed circle of the balls 6.

Figure 4:
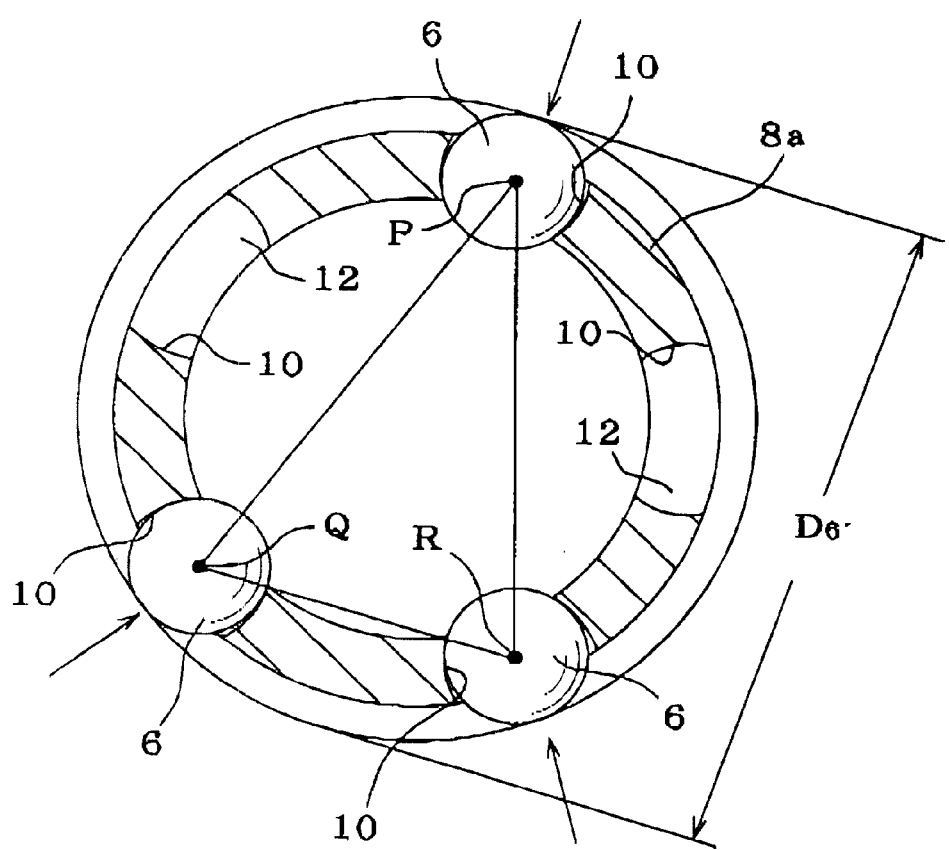
FIG. 4 is a cross sectional view of a cage having an odd number of pockets for use in a second example of the embodiment of the present invention in the state where three balls are held in three pockets of the cage and then moved radially inward in the cage as indicated by arrows.

The present example is explained on an even number (specifically six) of pockets 10 provided in the cage 8a. On the other hand, it is also possible in the case where the cage 8a is formed with an odd number of pockets 10 as in the second example of the embodiment of the present invention (five pockets in the second example) to easily obtain the diameter $D_6'$ of the circumscribed circle of the balls 6 by inserting the cage 8a into the interior of the gage 13 (see FIG. 3) with three of the balls 6 in three of the pockets 10 in the cage 8a. In this case, it is preferable as shown in FIG. 4 that the angles at the apexes ($\angle PQR$, $\angle QRP$, $\angle RPQ$) are all an acute angle in the traingle PQR formed by connecting the centers P, Q, R of the three balls 6, too.

It is also possible to obtain the diameter $D_6'$ of the circumscribed circle of the balls 6 by inserting the cage 8a into the gage 13 with four or more of the balls 6 in four or more of the pockets 10 in the cage 8a, respectively. As more balls 6 are held in more pockets 10 in the cage 8a and then the cage 8a is inserted into the gage 13, elastic deformation of the cage 8a upon diameter measurement can be kept smaller, and it is possible to precisely obtain the diameter $D_6$, $D_6'$ of the circumscribed circle of the balls 6 to be measured. However, in this case, not only the work to install the balls 6 is inconvenient, but also the number of useless balls 6 increases if the diameters $D_6$, $D_6'$ of the circumscribed circle are not suitable to the application, and if the balls 6 are not adapted for re-using. Taking into consideration these facts, it is most preferable that the number of balls 6 to be installed into the cage 8a is three to obtain the diameter $D_6$, $D_6'$ of the circumscribed circle of the balls 6.

Figure 5:
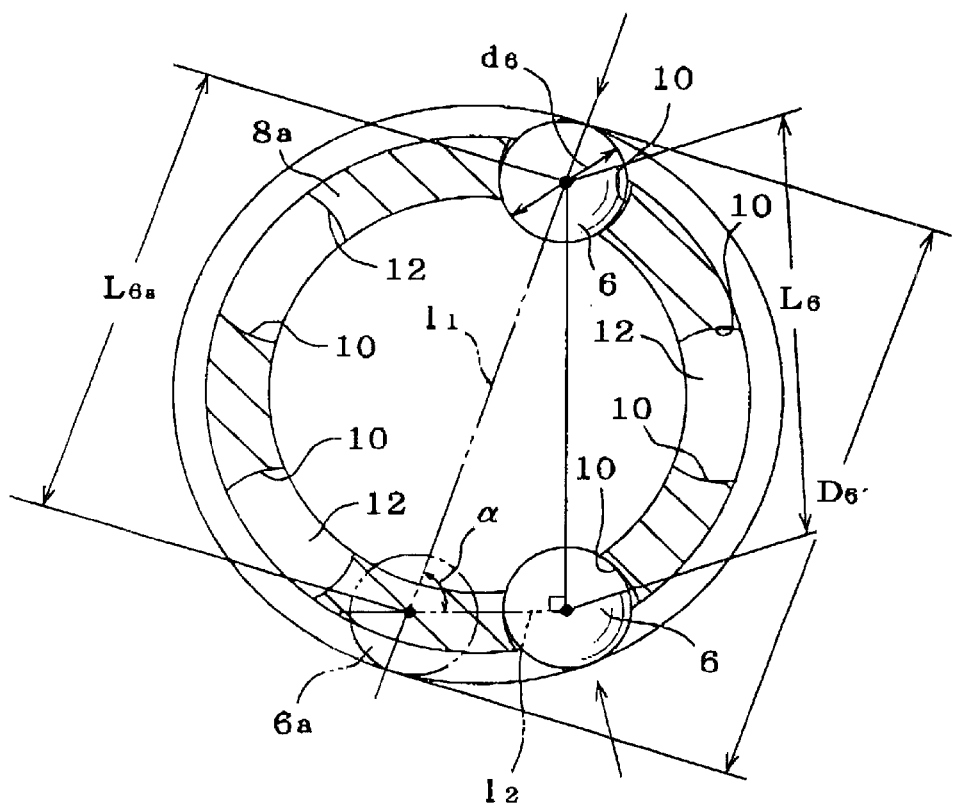
FIG. 5 is a cross sectional view of a cage having an odd number of pockets in the state where three balls are held in two pockets of the cage and then moved radially inward in the cage as indicated by arrows.

In addition, it is possible to obtain the diameter of the circumscribed circle of the balls 6 with two of the balls 6 held in two of the pockets 10 in the cage 8a. For example, when an even number of pockets 10 are provided in the cage 8a, the cage 8a is inserted into the gage 13 with two balls held in two of the pockets 10 on the radially opposite sides of the cage 8a to obtain the diameter of the circumscribed circle of the balls 6. On the other hand, when an odd number of pockets 10 are provided in the cage 8a, the diameter of the circumscribed circle of the balls 6 is obtained for example as follows: Specifically, as shown in FIG. 5, one ball 6 is held in one (the uppermost one in FIG. 5) of the pockets 10 in the cage 8a while another ball 6 is held in one (the lowermost one in FIG. 5) of the pockets 10 nearest the location opposite to the uppermost one with reference to the diameter direction of the cage 8a. Then the cage 8a with the two balls 6 held is inserted into the gage 13, and then the two balls 6 are moved toward the radially inside of the cage 8a as indicated by arrows. In this case, care must be taken to keep the cage 8a concentric with the conical concave surface 14 of the gage 13. Then, the length $L_6$ between the centers of the two balls 6 is measured with the rolling contact surface of the balls 6 in contact with the end edge of the radially inner openings of the pockets 10.

Provided that a hypothetical ball 6a is held in the location opposite to the one of the balls 6 with reference to the diameter direction of the cage 8a (see FIG. 5), that a hypothetical line $l_1$ passes through the centers of the one of the balls 6 and the hypothetical ball 6a and that a hypothetical line $l_2$ passes through the centers of the another one of the balls 6 and the hypothetical ball 6a, the angle $\alpha$ between the hypothetical lines l1 and l2 is obtained by the following formula:

$$\alpha = (180 - 180/z) \div 2 \qquad (1)$$

wherein z is the total number of the pockets 10 (five in the example of FIG. 5).

By substituting $L_6$ and $\alpha$ in the following formula (2) with the amount of $L_6$ obtained as mentioned above, that is the length between the centers of the two balls 6 held in the cage 8a, and the amount of $\alpha$, that is the angle obtained from the formula (1), the length $L_{6a}$ between the centers of the balls 6 and 6a is obtained provided that the balls 6 and 6a are held in the two pockets 10 radially opposite to each other in the cage 8a.

$$L_{6a} = L_6 / \sin \alpha.$$

From the length $L_{6a}$ obtained as mentioned above and the outer diameter $d_6$ of the respective balls 6, the diameter $D_6'$ ($= L_{6a} + d_6$) of the circumscribed circle of the balls 6 is obtained.

If the cage 8a is inserted into the gage 13 with two of the balls 6 held in two of the pockets 10 in the cage 8a having an odd number of pockets 10 formed therein, it is difficult to arrange the cage 8a and gage 13 in the concentric locations. Therefore, in this case, it is necessary to take any proper means to arrange the cage 8a and gage 13 in the concentric locations.

Figure 6:
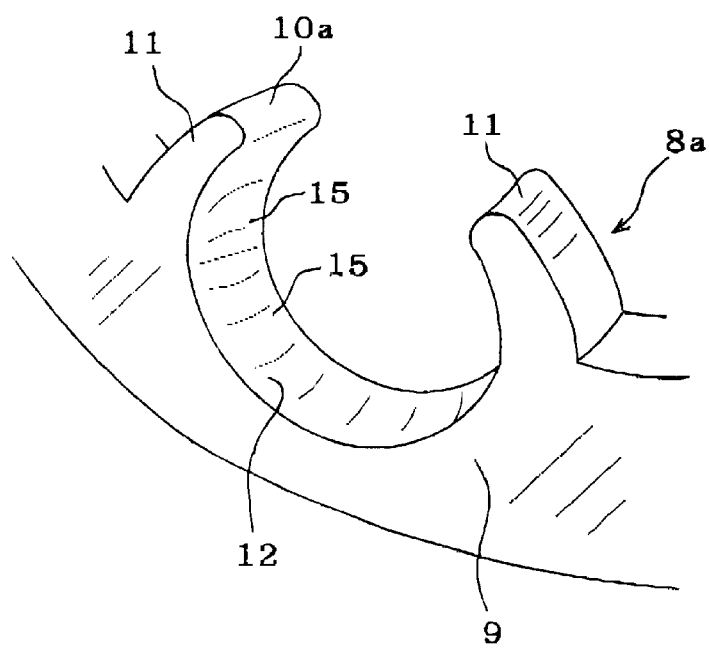
FIG. 6 is a perspective view of part of a cage to show a second example of the pockets provided in the cage.
Figure 7:
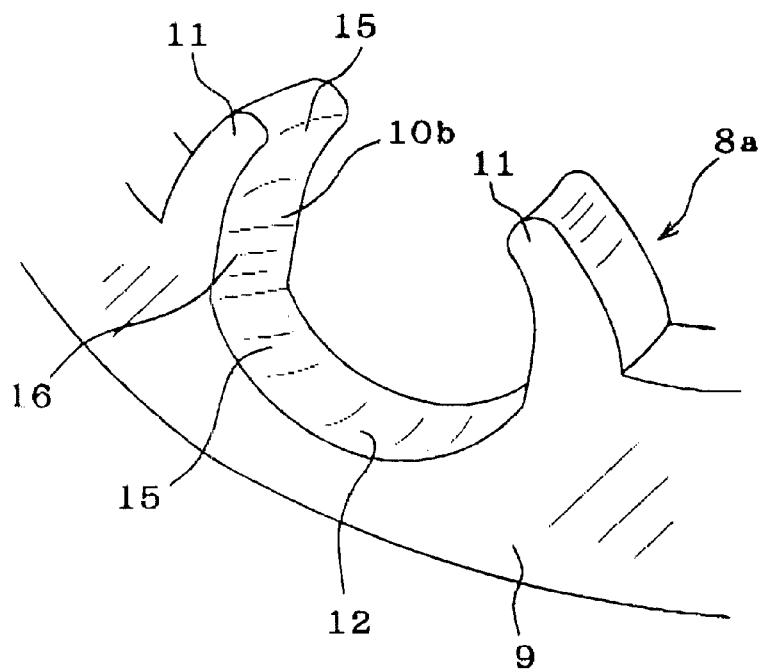
FIG. 7 is a perspective view of part of a cage to show a third example of the pockets provided in the cage.
Figure 8:
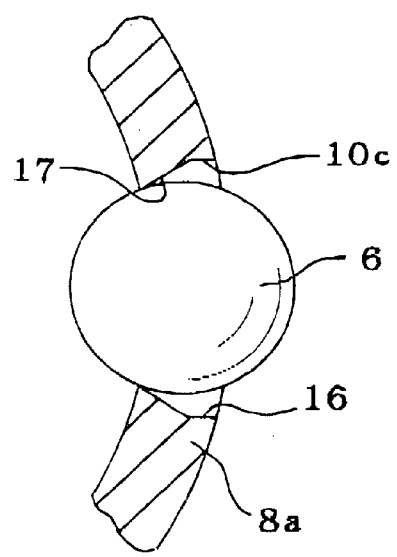
FIG. 8 is a perspective view corresponding to X portion in FIG. 1 of part of a cage to show a fourth example of the pockets provided in the cage.
Figure 9:
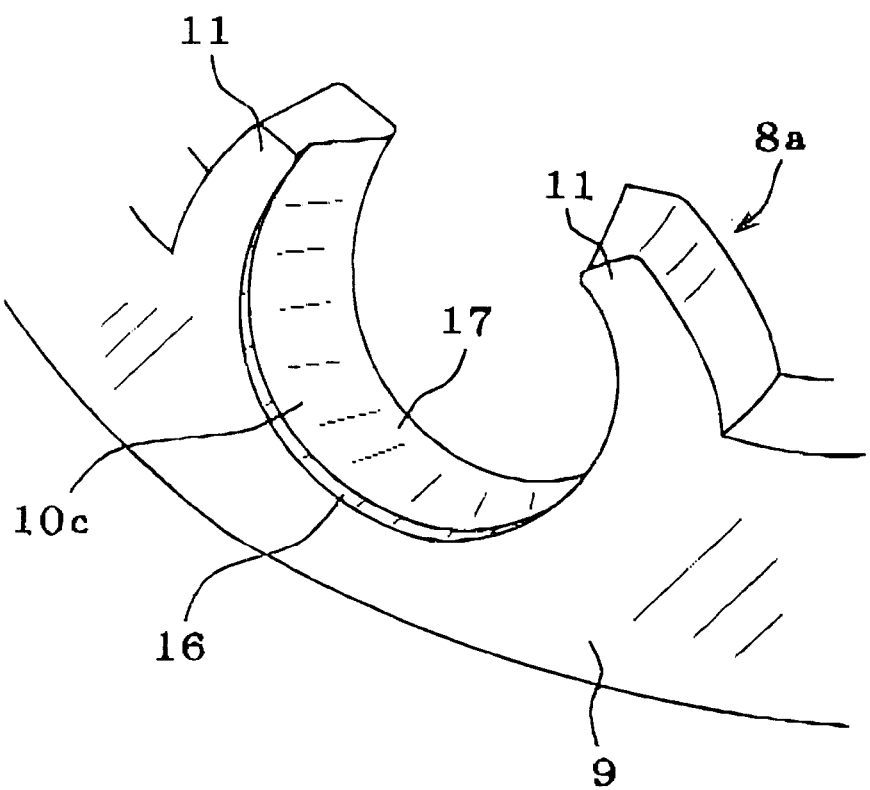
FIG. 9 is a perspective view of part of a cage to show another example of the pockets provided in the cage.

The examples explained above are directed to the case where the inner surface of the respective pockets 10 in the cage 8a is formed in a single spherical concave surface, however the present invention is not limited to these examples and can be applied to the inner surface in another shape. For example, in the case of the structure as shown in FIG. 6, the inner surface of the respective pockets 10a in the cage 8a is defined by a combination of two spherical concave surfaces 15 to form in a Gothic arch shape where the centers of the respective radii of curvature are separated from each other and located at two locations. The present invention can be applied to the case where the inner surface of the respective pockets 10a is formed as mentioned above, resulting in similar effects. In addition, the inner surface of the respective pockets 10b shown in FIG. 7 is formed in a shape of spherical concave surface section 15 and cylindrical surface section 16 continued to each other, and the inner surface of the respective pockets 10c shown in FIGS. 8 and 9 is formed in a shape of conical concave surface section 17 and a cylindrical surface section 16 continued to each other, and the present invention can be applied to these structures with similar effects.

When producing the ball bearing of the present invention, obtaining the diameter of the circumscribed circle of the balls held in the pockets of the cage is not necessarily conducted to all the cages. Specifically, although there may be slight discrepancy in the shape and dimension of the cages manufactured by injection molding synthetic resin from the value on design due to errors inevitablly caused upon production, the discrepancy is substantially uniform in the same lot. In addition, the error in the outer diameter of the respective balls is controlled small comparing with the cage. Accordingly, the standard balls (master balls) finished with the precise diameter are used to determine the good or not of the cage in the lot, and only in the case of good, cages in the lot are used to assemble ball bearings.

In this case, the standard balls are held in all the pockets of the sample cage, repectively, the diameter of the circumscribed circle of the standard balls held in the pockets of the sample cage is measured using the gage 13 as shown in FIG. 3. Then, only when the diameter is smaller than the inner diameter of the outer ring raceway by an amount in the range of 10 μm to 60 μm, the balls are held in the pockets of the cage in the lot, which are then installed in between the outer ring and the inner ring.

EXAMPLES

Figure 13:
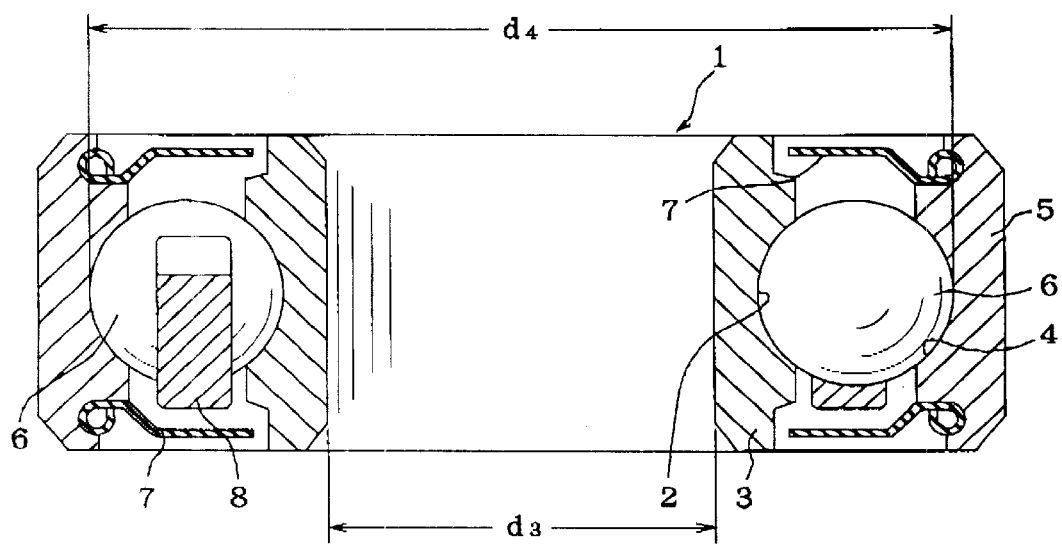
FIG. 13 is a cross sectional view of an example of the ball bearing.
Figure 14:
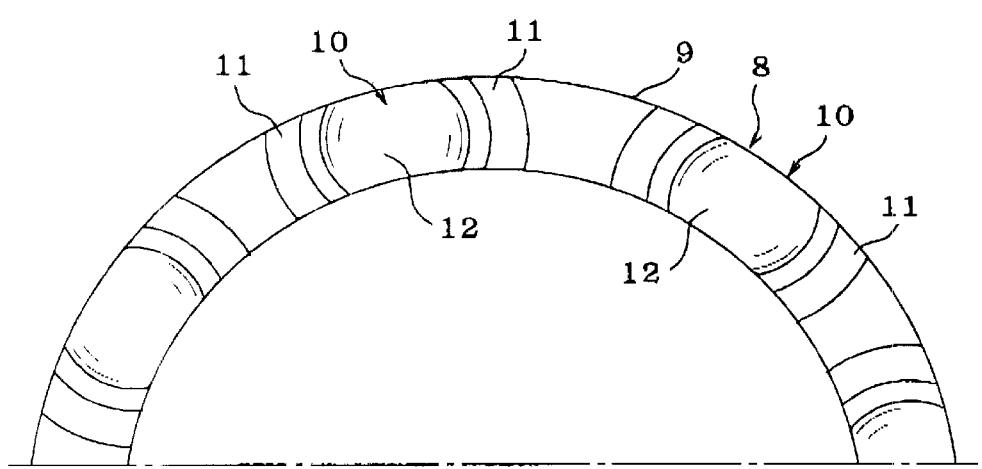
FIG. 14 is a top plan view of a half of the cage in an example to be installed in a ball bearing.
Figure 15:
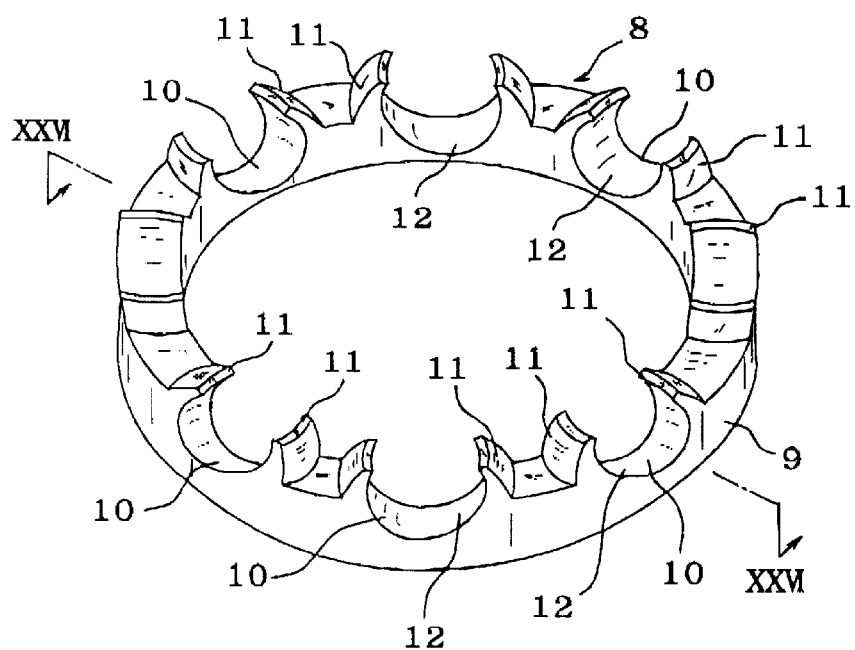
FIG. 15 is a perspective view of a cage to be installed in a ball bearing.
Figure 16:
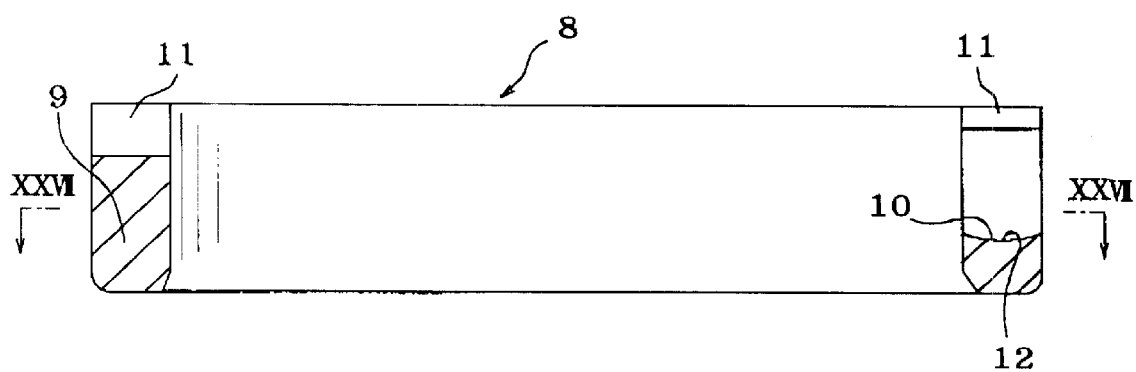
FIG. 16 is a cross sectional view taken along the line XXVI—XXVI in FIG. 15 with the other portions than the cut portion being omitted.
Figure 17:
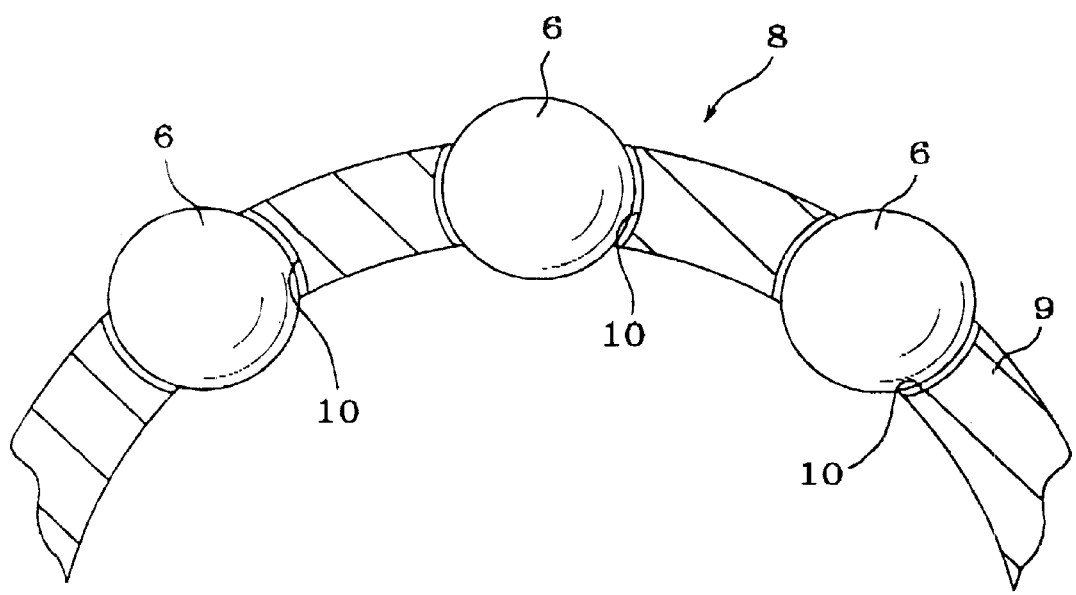
FIG. 17 is a cross sectional view partly taken along the line XXVII—XXVII in FIG. 16 with the balls installed therein.

Next, the results of the experiments the present inventors conducted to confirm the effects of the present invention are explained. The experiments are conducted using a ball bearing of the deep groove type as shown in FIG. 13. In addition, a synthetic resin cage of the crown type as shown in FIGS. 14 to 16 is used to incorporate in the ball bearing. In the experiments, the balls held in the respective pockets in the cage are moved toward the radially inside of the cage until the balls come into contact with the end edges of the radially inner openings of the pockets, and in this state, the rotation resistance on the ball bearing and the ball component of the NRRO are measured with the diameter of the circumscribed circle of the balls variously changed with reference to the inner diameter of the outer ring raceway.

Figure 10:
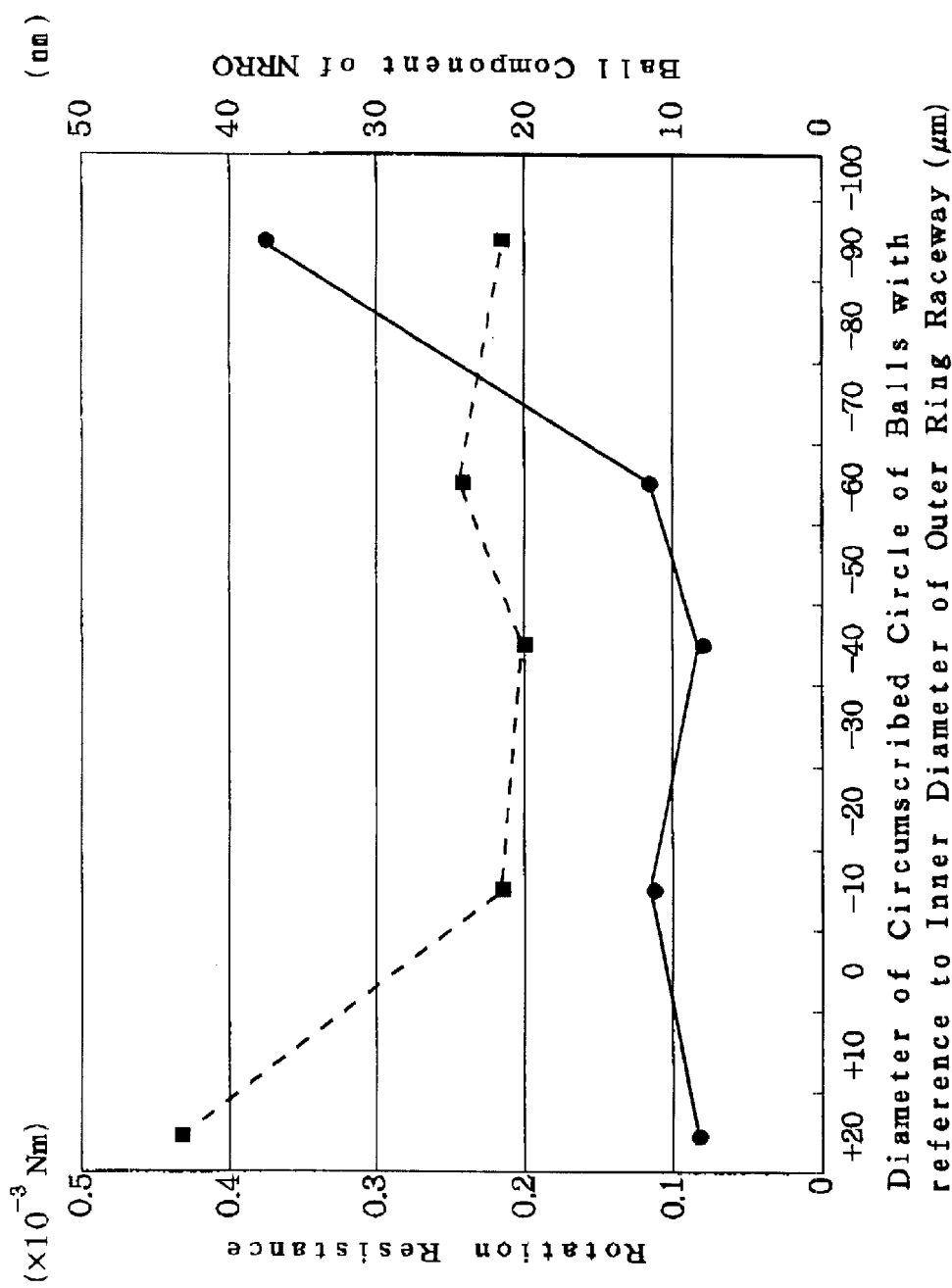
FIG. 10 is a graph to show the results of a first experiment conducted to confirm the effects of the present invention.
Figure 11:
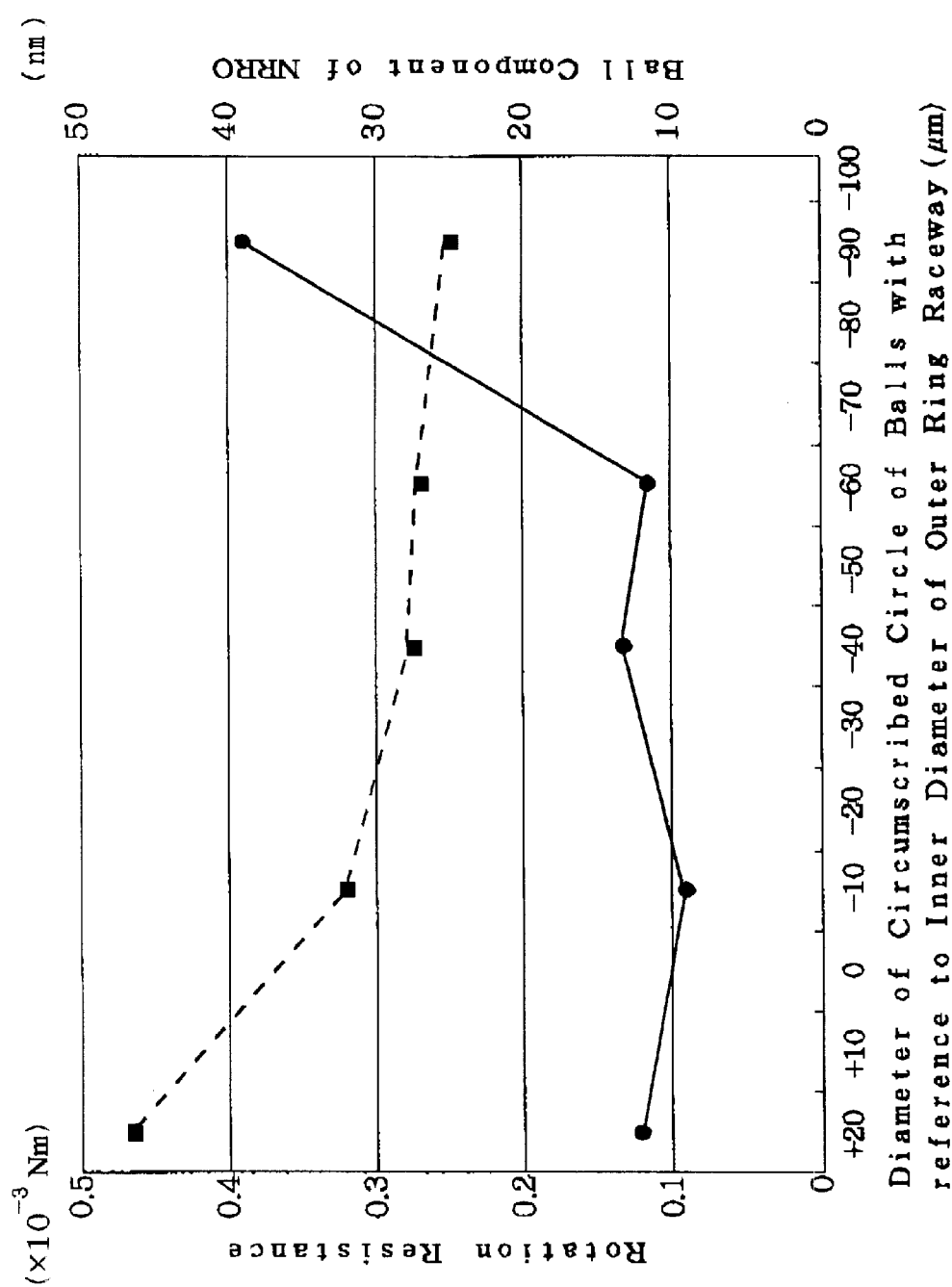
FIG. 11 is a graph to show the results of a second experiment conducted to confirm the effects of the present invention.
Figure 12:
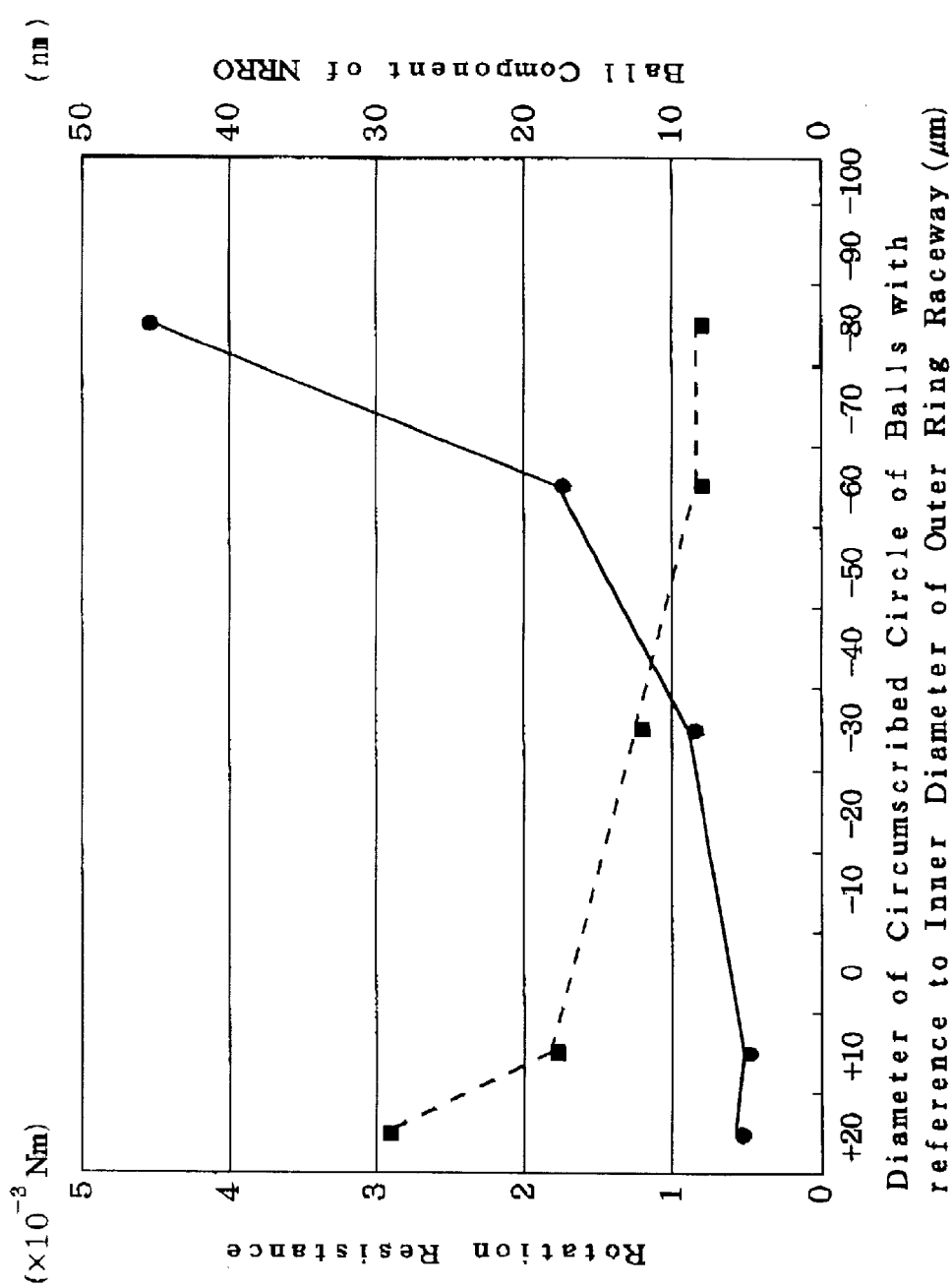
FIG. 12 is a graph to show the results of a third experiment conducted to confirm the effects of the present invention.

With the ball bearing used in the first experiment the result of which is shown in FIG. 10, the inner diameter of the inner ring is 4 mm, the outer diemeter of the outer ring is 10 mm, the width of the inner and outer rings is 2.6 mm. On the other hand, with the ball bearing used in the second experiment the result of which is shown in FIG. 11, the inner diameter of the inner ring is 5 mm, the outer diemeter of the outer ring is 13 mm, the width of the inner and outer rings is 3 mm. And, with the ball bearing used in the third experiment the result of which is shown in FIG. 12, the inner diameter of the inner ring is 6 mm, the outer diemeter of the outer ring is 15 mm, the width of the inner and outer rings is 4 mm. In FIGS. 10 to 12, the abscissa indicates the diameter of the circumscribed circle of the balls with reference to the inner diameter of the outer ring raceway, wherein the mark "+" indicates that the the inner diameter of the outer ring raceway is smaller than the diameter of the circumscribed circle of the balls in the cage in a free state while the mark "−" indicates that the inner diameter of the outer ring raceway is larger than the diameter of the circumscribed circle of the balls in the cage in the free state. In addition, in FIGS. 10 to 12, the solid line indicates the ball component (nm) of the NRRO while the dotted line indicates the rotation resistance ($10^{-3} \times Nm$). As clear from the results of the first to third experiments as shown in FIGS. 10 to 12, the NRRO is sufficiently reduced and the rotation resistance is made sufficiently small.

With the present invention constructed and operated as mentioned above, the ball bearing with sufficiently reduced NRRO and sufficiently small rotation resistance is constantly realized. Accordingly, the performance of the rotation machines such as HDDs with the ball bearing of the present invention installed therein can be improved and the power consumption of the rotation machines can be reduced. In addition, useless work can be removed after assembling the ball bearing of the present invention, so that the yield of the parts is increased and the cost is decreased.

What is claimed is:

1. A ball bearing comprising;
   an inner ring having an outer peripheral surface formed with an inner ring raceway thereon,
   an outer ring having an inner peripheral surface formed with an outer ring raceway thereon, the outer ring raceway having an inner diameter,
   a cage made of synthetic resin and rotatably disposed relative to the inner ring and outer ring and having a plurality of pockets formed therein, and
   a plurality of balls held in the pockets, respectively, to be rotatably disposed between the inner ring raceway and outer ring raceway,
   wherein in the state before the cage is disposed between the inner ring and the outer ring, and where the balls held in the pockets are displaced toward the radially inside of the cage until the rolling contact surface of the balls comes in contact with the inner surface of the respective pockets to produce a circumscribed circle with a diameter with respect to the balls, the diameter of the circumscribed circle is smaller than the inner diameter of the outer ring raceway by an amount in the range of 10 μm to 60 μm.

2. A method of producing the ball bearing of claim 1 comprising the steps of; selecting and holding some of the balls in some of the pockets respectively,
   moving the selected balls in the respective pockets radially inward with reference to the cage,
   in this state, obtaining the diameter of the circumscribed circle with respect to the selected balls which is concentric with the cage, and installing the cage and balls in between the outer ring and inner ring only in the case where the diameter of the circumscribed circle is smaller than the inner diameter of the outer ring raceway by an amount in the range of 10 μm to 60 μm.

3. A method of producing the ball bearing of claim 2 comprising the steps of;

providing a cylindrical gage to have an inner peripheral surface formed with a conical concave surface inclined slightly with reference to the axial direction, so that an end opening is provided on the larger diameter side, holding the selected balls in the pockets of the cage, inserting the cage and selected balls into the cylindrical gage from the end opening on the larger inner diameter side of the gage, keeping the cage concentric with the gage, in this state, measuring the inner diameter of the gage coresponding to the length by which the cage has been inserted into the gage wherein the inner diameter is equal to the diameter of the circumscribed circle with respect to the balls.

4. A method of producing ball bearings constructed as in claim 1, comprising the steps of;

providing a lot comprising a number of cages, selecting one to several sample cages from the lot, the sample cages having pockets provided therein, holding standard balls in the respective pockets in the sample cage, the standard balls having an outer diameter precisely finished, providing a cylindrical gage having an inner peripheral surface formed with a conical concave surface which is slightly inclined with reference to the axial direction, so that an end opening is provided on the larger diameter side, inserting the cage and standard balls into the cylindrical gage from the end opening on the larger inner diameter side of the gage, keeping the cage concentric with the gage, in this state, measuring the inner diameter of the gage coresponding to the length by which the cage has been inserted into the gage wherein the inner diameter is equal to the diameter of the circumscribed circle with respect to the balls, and only in the case where the diameter of the circumscribed circle is smaller than the inner diameter of the outer ring raceway by an amount in the range of 10 μm to 60 μm, holding the balls in the pockets of the cages in the lot to install the cages and balls between the respective outer and inner rings in the ball bearings.

* * * * *